SYSTEM FOR TRANSLATING CODED MESSAGE TO PRINTED RECORD

Filed July 1, 1954 4 Sheets-Sheet 1

INVENTORS
WILLIAM A. TOLSON,
BERTRAM A. TREVOR AND
CHARLES J. YOUNG
BY Charles H. Brown
ATTORNEY INVENTORS
WILLIAM A. TOLSON,
BERTRAM A. TREVOR AND
CHARLES J. YOUNG
BY Charles H. Brown
ATTORNEY INVENTORS
WILLIAM A. TOLSON,
BERTRAM A. TREVOR AND
CHARLES J. YOUNG
BY
Charles H. Brown
ATTORNEY March 17, 1959 W. A. TOLSON ET AL 2,878,313
SYSTEM FOR TRANSLATING CODED MESSAGE TO PRINTED RECORD
Filed July 1, 1954 4 Sheets-Sheet 4

Fig. 3

| 1 | 2 | 3 | 4 | 5 | LETTERS | FIGURES |
|---|---|---|---|---|---|---|
| 1 | 1 | 0 | 0 | 0 | A | - |
| 1 | 0 | 0 | 1 | 1 | B | ? |
| 0 | 1 | 1 | 1 | 0 | C | : |
| 1 | 0 | 0 | 1 | 0 | D | $ |
| 1 | 0 | 0 | 0 | 0 | E | 3 |
| 1 | 0 | 1 | 1 | 0 | F | ! |
| 0 | 1 | 0 | 1 | 1 | G | & |
| 0 | 0 | 1 | 0 | 1 | H | # |
| 0 | 1 | 1 | 0 | 0 | I | 8 |
| 1 | 1 | 0 | 1 | 0 | J | BELL |
| 1 | 1 | 1 | 1 | 0 | K | ( |
| 0 | 1 | 0 | 0 | 1 | L | ) |
| 0 | 0 | 1 | 1 | 1 | M | . |
| 0 | 0 | 1 | 1 | 0 | N | , |
| 0 | 0 | 0 | 1 | 1 | O | 9 |
| 0 | 1 | 1 | 0 | 1 | P | 0 |
| 1 | 1 | 1 | 0 | 1 | Q | 1 |
| 0 | 1 | 0 | 1 | 0 | R | 4 |
| 1 | 0 | 1 | 0 | 0 | S | ' |
| 0 | 0 | 0 | 0 | 1 | T | 5 |
| 1 | 1 | 1 | 0 | 0 | U | 7 |
| 0 | 1 | 1 | 1 | 1 | V | ; |
| 1 | 1 | 0 | 0 | 1 | W | 2 |
| 1 | 0 | 1 | 1 | 1 | X | / |
| 1 | 0 | 1 | 0 | 1 | Y | 6 |
| 1 | 0 | 0 | 0 | 1 | Z | " |
| 0 | 0 | 1 | 0 | 0 | SPACE | |
| 0 | 0 | 0 | 1 | 0 | CARRIAGE RETURN | |
| 0 | 1 | 0 | 0 | 0 | LINE FEED | |
| 1 | 1 | 1 | 1 | 1 | LETTERS | |
| 1 | 1 | 0 | 1 | 1 | FIGURES | |

INVENTORS
WILLIAM A. TOLSON,
BERTRAM A. TREVOR &
CHARLES J. YOUNG
BY
Charles H. Brown
ATTORNEY United States Patent Office 2,878,313

Patented Mar. 17, 1959

2,878,313

SYSTEM FOR TRANSLATING CODED MESSAGE TO PRINTED RECORD

William A. Tolson, Hightstown, and Bertram A. Trevor and Charles J. Young, Princeton, N. J., assignors to Radio Corporation of America, a corporation of Delaware Application July 1, 1954, Serial No. 440,722

10 Claims. (Cl. 178—30)

This invention relates to systems for translating coded messages to printed records, and particularly to a high-speed electronic system for translating a coded signal, wherein intelligence characters are represented by mark and space bits in succession, to a printed record of intelligence characters.

In telegraphy, messages are customarily transmitted using the 5-unit start-stop code wherein each of the twenty-six alphabetic characters and five additional control characters are represented by five successive mark and space units. The mark and space units may be considered as information bits. An electrical signal representing five information bits in time sequence must be translated to the corresponding alphabetic character in printed form. Electromechanical machines have long been used for this purpose. These machines, however, are basically limited in speed of operation to speeds in the order of 100 words per minute. It is therefore a general object of this invention to provide an improved electronic printing system capable of speeds in the order of 600 words per minute.

It is another object of this invention to provide an improved electronic printing system which is as simple and economical as possible commensurate with the speed of operation thereof.

It is a further object to provide an improved electronic printing system requiring relatively very little maintenance effort.

It is a still further object to provide an improved high speed printing system involving no departure from standard operating procedure.

In one aspect, the invention comprises, a serial-to-simultaneous (ser-sim) extensor to which the input coded signal of successive bits is applied. The five bits of the five-unit code are stored in the ser-sim extensor. After the five bits are stored, a magnetic ring counter provides a signal which simultaneously releases the five bits from the extensor to a decoder. The decoder is in the nature of a well-known relay three arrangement having thirty-one output leads only one of which is energized as a result of the application to the decoder of the five simultaneous bits.

Twenty-six of the output leads from the decoder correspond with the twenty-six alphabetic characters. Each of the twenty-six leads is threaded thru a 5 x 7 magnetic core matrix in such a way as to define the corresponding alphabetic character. After the character has been stored in the matrix, the vertical rows of magnetic cores in the matrix are successively read out under the control of an electro-magnetic commutator. Simultaneous outputs are obtained from the matrix for each of the magnetic cores in a particular vertical row. The several outputs are simultaneously applied to a corresponding number of printing styli in a printing mechanism.

Three outputs from the decoder are coupled to the printing mechanism to control the line feed, the spacing, and the carriage return functions thereof. Two additional output leads from the decoder control a multipole double-throw switch which can reconnect the twenty-six character output leads from the decoder to an additional twenty-six leads threaded thru the magnetic core matrix to define twenty-six figures (numbers and symbols). Thus a given received five-unit coded signal results in the printing of the corresponding alphabetic character or figure depending on whether the five-unit signal for letters or figures was previously received.

These and other objects and aspects of the invention will be apparent to those skilled in the art from the following more detailed description of the invention taken in conjunction with the appended drawing wherein:

Figure 1*a* and Figure 1*b* taken together show a circuit diagram of a printing system constructed according to the teachings of this invention;

Figure 3 is a chart showing the letters and figures corresponding with conventional five-unit code signals.

Figure 1A:
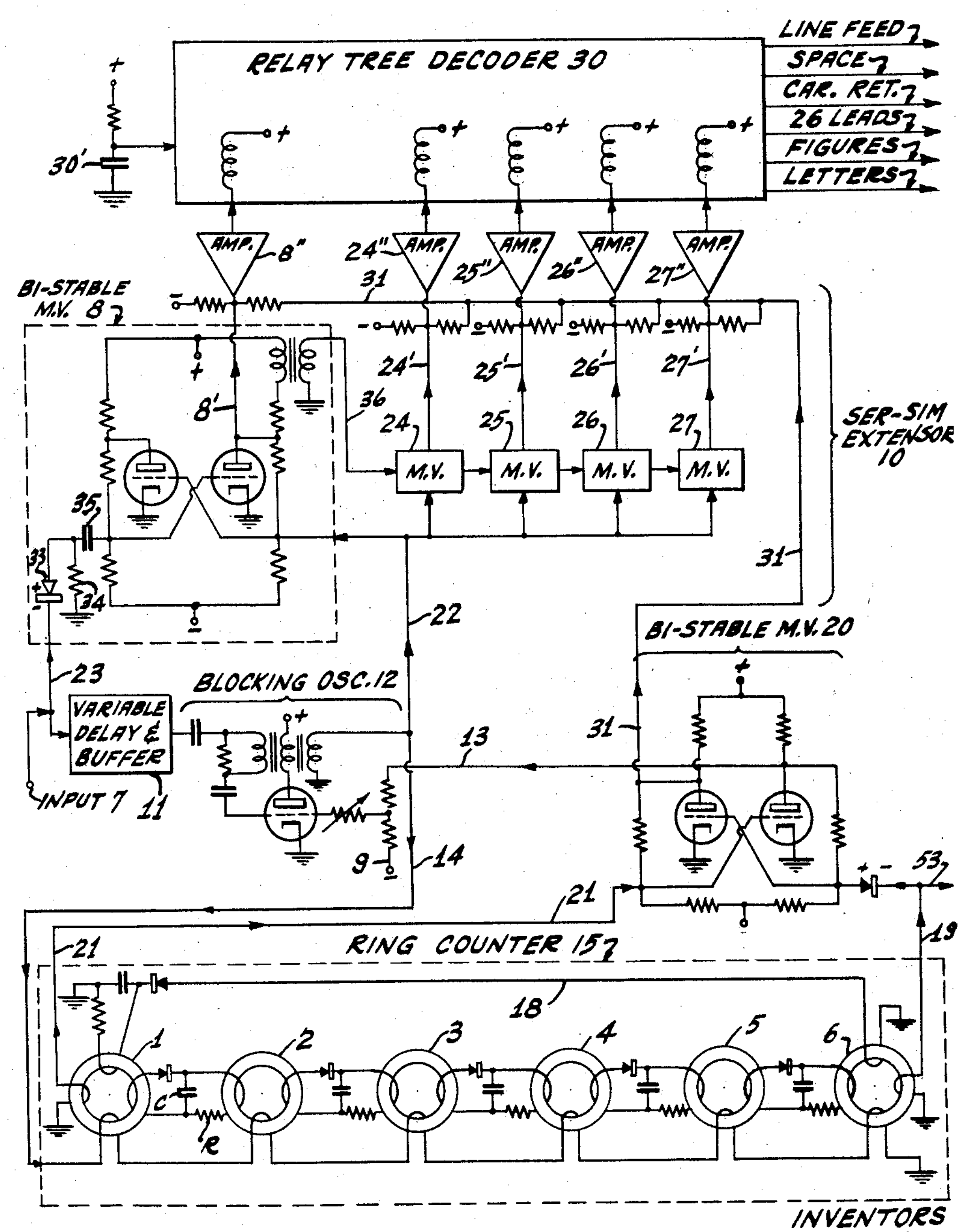
Figure 1A:
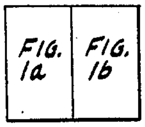
Figure 1B:
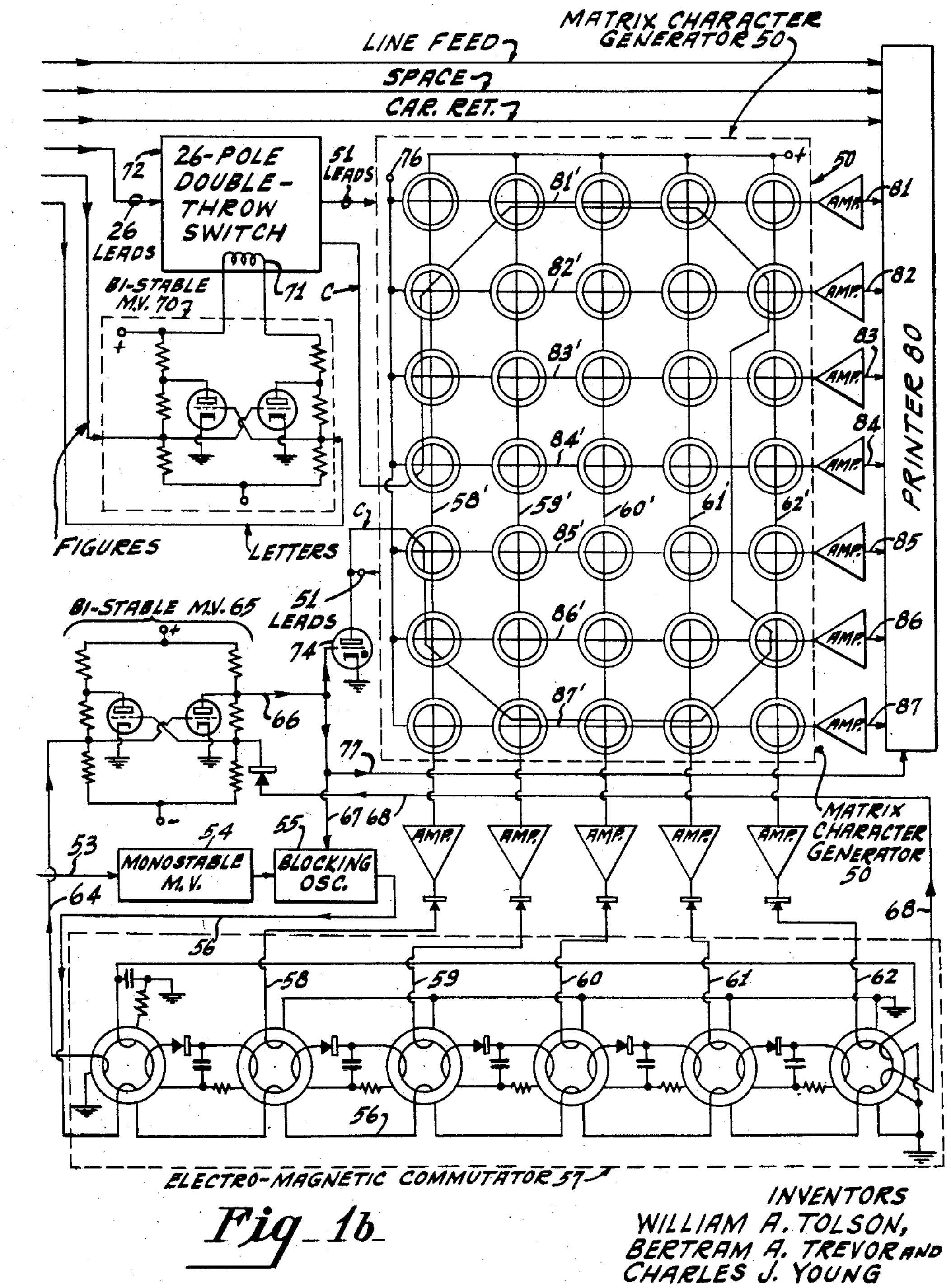
Figure 4:
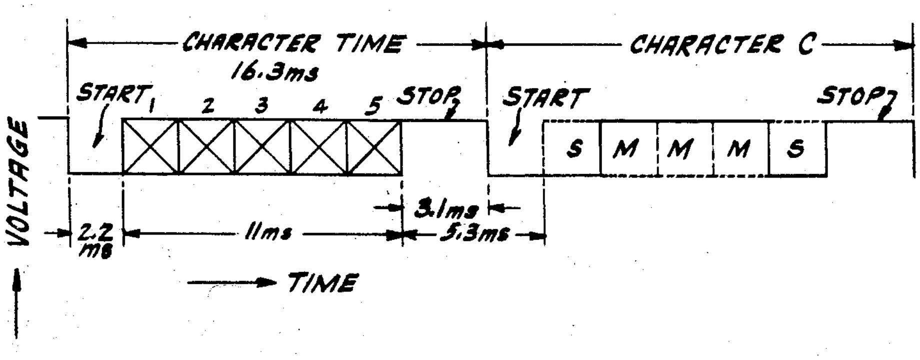
Figure 4 is a chart illustrating time and polarity characteristics of five-unit coded signals in a system operating at 600 words per minute.

Figures 1*a* and 1*b* taken together show an electronic printing system. The signal applied on the input lead 7 is a coded signal wherein each intelligence character is represented by mark units or bits of one potential and space units or bits of a different potential. By way of example, the invention will be described as applied to the conventional start-stop code as shown in Figure 3 and Figure 4. The invention will be described as handling 600 words per minute, in which case an intelligence character is allotted 16.3 milliseconds of which 2.2 milliseconds is allotted to the start unit or bit which is a mark signal, the five code bits are each allotted 2.2 milliseconds, and the stop unit or bit is allotted 3.1 milliseconds. In telegraph terminology, a character signal is said to be made up of mark and space units. In computor terminology, a coded character is said to be made up of binary bits numerically designated either 1 or 0. In the chart of Figure 3, the bits designated 1 correspond with a mark unit, and the bits designated 0 correspond with a space unit. The start unit of the conventional code is a space unit or a binary 0 bit, and the stop signal is a mark unit or a binary 1 bit.

An input signal on lead 7 is applied over lead 23 to the input of a bi-stable multivibrator 8 in a serial-to-simultaneous (ser-sim) extensor 10, and also to a variable delay and buffer circuit 11. The output of the circuit 11 is applied to one input of a blocking oscillator 12. The initial start bit of the signal applied to input lead 7 causes blocking oscillator 12 to start oscillating with a period of 2.2 milliseconds. Oscillator 12 continues oscillating until a stop signal is received over lead 13 in a manner which will become apparent as the description proceeds.

An output of the blocking oscillator 12 is applied over lead 14 to the transfer input of a magnetic core ring counter 15. Ring counter 15 is of the general type described in an article starting at page 401 of the April 1951 issue of the Proceedings of the IRE in an article entitled "Magnetic Delay-Line Storage" by An Wang. The particular ring counter 15 shown in the drawing is constructed of magnetic cores wherein each core is coupled to the next thru a diode and delay circuit, and a single common reset coupling is employed. Any desired magnetic core ring counter may be employed in the box 15.

The magnetic core ring counter 15 includes six similar magnetic cores arranged from left to right in the drawing, each magnetic core being coupled to the next thru a diode and delay circuit. The sixth magnetic core is coupled back to the first to provide a complete loop or ring. An output is taken from the sixth ring over lead 19 to an input of a bi-stable oscillator-control multivibrator 20, and an output is taken from the first magnetic core over lead 21 to another input of the bi-stable multivibrator 20.

Extensor 10 is a five-stage circuit and includes in addition to bi-stable multivibrator 8 four additional multivibrators 24 thru 27, each of which is the same and has the same circuit arrangement as multivibrator 8. The five multivibrators are coupled together in a chain. The five outputs of the five multivibrators on leads 8′ and 24′ thru 27′ are applied thru individual amplifiers to a decoder 30 which is in the form of a relay tree arrangement. A negative bias is applied to the output leads 8′ and 24′ thru 27′ of the five multivibrators from negative terminals of a source of undirectional potential (not shown). The negative bias prevents outputs from the multivibrators from being applied to the decoder 30 in the absence of a signal from multivibrator 20 over lead 31 which overcomes the bias and allows the outputs of the multivibrators to be applied to the decoder 30.

The decoder 30 is of the type described on pages 52, 53 and 113 of "Design of Switching Circuits" by William Keister, published by Van Nostrand Co., New York, 1951. The particular decoder 30 has five inputs to five relay coils, and has thirty-one outputs on thirty-one separate leads. Twenty-six of the leads correspond with the twenty-six letters of the alphabet. The other five leads correspond with control functions designated line feed, space, carriage return, figures, and letters. The relay contacts in the decoder 30 are normally open. When an input signal is applied to the five input leads of the decoder, contacts close which connect the charged capacitor 30′ to one of the thirty-one output leads. The output of the decoder is thus a pulse. While a relay tree decoder is described, other known decoders of similar operation using diodes, and so on, may be employed. The operation of that part of the circuit shown in Figure 1*a* will now be described on the assumption that a single five-unit coded alphabetic character signal beginning with a start pulse and ending with a stop pulse is received on input lead 7. Blocking oscillator 12 is initially quiescent by reason of a negative bias supplied thereto over lead 9. In the magnetic core counter 15, the left hand core is magnetized in the 1 direction, and the other five magnetic rings are magnetized in the 0 direction. The right-hand tube in the multivibrator 20 is conductive. The initial start pulse is applied thru input lead 7, thru variable delay and buffer circuit 11 to the blocking oscillator 12. The purpose of the variable delay is to make the pulse from the blocking oscillator 12 occur at the center of the start pulse rather than at the leading edge thereof. The delay is preferably made variable to permit optimum operation in the face of variable width signal pulses due to multi-path reception. The circuit 11 also includes a buffer tube to prevent kick-back from the oscillator.

The received start pulse causes an output from the blocking oscillator 12 which is applied over lead 14 to all six of the magnetic cores 1 to 6 in the counter 15. The polarity of the pulse is such as to magnetize all the magnetic cores in the 0 direction. Since all cores other than the first are already magnetized in the 0 direction, a voltage is produced only in the output of the first core, which is coupled to the second core 2. This voltage is in the proper direction to be passed by the diode to cause the second core 2 to be magnetized in the 1 direction. The coupling circuit between the first magnetic core and the second magnetic core includes a capacitor C and a resistor R which delays the application of the output of the first magnetic core to the second until after termination of the signal from the oscillator 12 over lead 14 which has magnetized all cores in the 0 direction.

The voltage generated in transferring the 1 condition from the first core to the second core is also generated in another output coupling of the first core and applied over lead 21 to an input of the bistable multivibrator 20. This causes the righthand tube of the multivibrator 20 to be rendered non-conductive with the result that a positive potential appears on the output lead 13 which neutralizes the negative bias on the grid of the blocking oscillator 12 so that the oscillator 12 is free to continue oscillating. With every cycle of oscillation of blocking oscillator 12 applied over lead 14 to the transfer coils of all six magnetic cores in counter 15, the initial magnetization in the 1 direction of the second core, due to the start pulse, is transferred on to the next magnetic core. After the fifth cycle of oscillation of oscillator 12, an output from the sixth magnetic core 6 is applied over lead 19 to an input of the bi-stable multivibrator 20 which again renders the right-hand tube in the multivibrator conductive so that the plate voltage on lead 13 drops to a value insufficient to overcome the negative bias on lead 9. The negative bias renders oscillator 12 quiescent. At the same time, the coupling of the sixth magnetic core back to the first magnetic core over lead 18 magnetizes the first magnetic core in the 1 direction. The magnetizations of the six magnetic cores in the counter 15 are thus restored to their initial conditions in which they are ready for the start pulse of the next succeeding character signal.

The blocking oscillator begins oscillation in response to the received start pulse and continues to oscillate for the duration of one input character signal by reason of the operation of the counter 15 and the multivibrator 20 as has been described. The five code bits of the character signal following the start pulse are in no way effective in altering the operation of these circuits.

The initial start pulse (a negative-going pulse) received on input lead 7 is also applied over lead 23 to an input of bi-stable multivibrator 8 in the ser-sim extensor 10. The right-hand tube in the multivibrators 8, and 24 thru 27 are normally conductive. When the initial start pulse is applied to the multivibrator or locking circuit 8, the right-hand tube is rendered non-conductive. This change of state is not coupled to the following multivibrator 24 by reason of the presence of a diode in the input circuit of the multivibrator 24. A second output of the blocking oscillator 12 is also applied over lead 22 to inputs of all of the multivibrators 8 and 24 thru 27.

The function of the extensor 10 is to receive in serial form the code bits identifying a particular character and to present on demand from the multivibrator 20 the entire code group to the decoder 30. Each pulse from the oscillator 12 applied over lead 22 to the multivibrators 8 and 24 thru 27 causes all of the multivibrators to shift or be reset to the 0 state wherein the right-hand tube in the multivibrator is conductive. At the same time that a pulse is applied to the multivibrators from oscillator 12, the signal start pulse from input lead 7 is applied thru a diode 33 to an input of multivibrator 8. However, the effect on the multivibrator 8 due to the start pulse is delayed by a delay circuit comprising resistor 34 and capacitor 35 until the multivibrators have all been set to the 0 state by the pulse from the blocking oscillator 12. The next following pulse from the oscillator 12 applied to the multivibrators 8 and 24 thru 27 causes the multivibrators to be shifted to their 0 condition. Since the multivibrator 8 was previously put in the 1 condition by the received start pulse, the transition to the 0 condition results in the generation of an output pulse applied over lead 36 to the multivibrator 24 causing the multivibrator 24 to assume the 1 condition. The input of multivibrator 24 includes a diode 33, a resistor 34 and a capacitor 35 as shown in the circuit of multivibrator 8 so that the transition of multivibrator 24 is delayed until after the reset pulse from oscillator 12 is effective. Simultaneously with the reset pulse from oscillator 12 which results in the transfer of the condition 1 from multivibrator 8 to multivibrator 24, the first of the five code bits is applied to the input of multivibrator 8. It is thus apparent that the five code bits of the character signal are successively fed into the extensor 10 and are stored in order on the five multivibrators 8 and 24 thru 27. In the process, the original start pulse which caused the multivibrator 8 to initially assume the 1 condition is passed on thru the multivibrator 24 thru 27 and is lost by falling off the end of the chain of multivibrators.

At the instant when the five code bits are stored in the five multivibrators 8 and 24 thru 27, a negative output pulse is generated on the lead 19 coupled to the sixth magnetic core of the ring counter 15. This pulse changes the conductivity state of bi-stable multivibrator 20 so that the left-hand tube in the multivibrator 20 is rendered non-conductive and a relatively positive potential is applied over lead 31 to neutralize the negative bias on the output leads 8′ and 24′ thru 27′ of the multivibrators 8 and 24 thru 27. The negative bias on leads 8′ and 24′ thru 27′ normally bias the amplifiers 8″ and 24″ thru 27″ to cut off and this bias is overcome by the positive voltage on lead 31. Therefore, five signals representing the five code bits stored in the extensor 10 are simultaneously applied thru respective amplifiers to the five relay coils shown in box labeled decoder 30. One and only one of the thirty-one output leads from the decoder 30 is momentarily energized by the discharge from capacitor 30′ as will appear hereinafter. The cycle is repeated upon receipt of the next following coded character signal on input lead 7. It is thus apparent that the circuit shown in Figure 1*a* translates a serially received 5-unit coded signal to a signal on a single lead corresponding with the alphabetic character or the control function of the received coded character signal.

That portion of the circuit shown in Figure 1*b* receives a signal on one of the thirty-one output leads of decoder 30 in Figure 1*a*, and translates the signal to one which actuates a printing mechanism to print the corresponding character, or to perform the corresponding control function. The printing function is performed one character time period subsequent to the application of the corresponding character to the circuit of Figure 1*a*, and simultaneously with the application of the next succeeding character signal to the circuits of Figure 1*a*. The circuits in Figure 1*b* which control the sequence of operation will now be described.

After the initial start pulse has passed thru the ring counter 15 of Figure 1*a*, an output is generated on lead 19 from the sixth magnetic core and is applied over lead 53 to a monostable multivibrator 54 in Figure 1*b*. Any suitable monostable multivibrator may be employed which generates an output pulse of predetermined duration following the receipt of a trigger pulse. In the present example of a system capable of printing 600 words per minute, the output pulse from monostable multivibrator 54 should have a duration of 5.3 milliseconds. By reference to Figure 4, it will be seen that 5.3 milliseconds is the duration of one stop pulse and one start pulse between successive coded characters. Stated another way, 5.3 milliseconds is the time period between the last or fifth code bit of one character and the beginning of the first bit of the next succeeding character. The output of the monostable multivibrator 54 is applied to the input of a blocking oscillator 55 which may be the same as the blocking oscillator 12 in Figure 1*a*. The output of the blocking oscillator 55 on lead 56 is applied as a transfer pulse to all six magnetic cores in an electro-magnetic commutator 57.

Electro-magnetic commutator 57 is the same as the ring counter 15 in Figure 1*a* except that additional output couplings are provided on leads 58 thru 62 from the second thru the sixth of the magnetic cores. These additional couplings permit the start pulses successively passed thru the magnetic cores to be used to successively take out the information stored in the five vertical rows of cores in the matrix character generator 50. The operation may be considered to be that of a commutator.

The first output pulse on lead 56 from the blocking oscillator 55 results in a pulse on lead 64 from the first magnetic core in commutator 57 which is applied to an input of a bi-stable oscillator-control multivibrator 65. Bi-stable multivibrator 65 may be the same as bi-stable multivibrator 20 in Figure 1*a*, and it performs substantially the same function as has been described in connection with bi-stable multivibrator 20. The resulting output of multivibrator 65 taken over leads 66 and 67 to the input of blocking oscillator 55 overcomes the bias on the oscillator and allows it to continue oscillating. When the original start pulse has been transferred thru the cores of commutator 57, an output pulse is obtained from the sixth core and applied over lead 68 to an input of the multivibrator 65. This reverses the conductivity state of multivibrator 65 and stops the blocking oscillator 55. It is thus apparent that the bi-stable multivibrator 65 permits the blocking oscillator 55 to start oscillating on receipt of a start pulse, and then after the bistable multivibrator 65 has been shifted to its other conductive state by a signal from the output of the commutator 57, the bi-stable multivibrator 65 stops the blocking oscillator 55.

The output leads labeled "Figures" and "Letters" from the decoder 30 in Figure 1*a* are applied to the inputs of a bi-stable multivibrator 70 in Figure 1*b*. Bi-stable multivibrator 70 is similar to the other bi-stable multivibrators previously described except that its output is developed across a relay coil 71 in a twenty-six pole double-throw switch 72 having fifty-two separate output leads. In the drawing, fifty-one of the leads are grouped, and the fifty-second lead is labeled C. The fifty-two separate leads are threaded thru selected ones of the thirty-five magnetic cores in the matrix character generator 50. The other ends of the leads are all connected to the plate of a thyratron tube 74 constituting an electronic switch. The output on lead 66 of the multivibrator 65 is connected to the grid of the thyratron 74. The fifty-two leads are threaded thru selected ones of the magnetic cores in generator 50 so as to describe the corresponding twenty-six alphabetic characters and the twenty-six figures and other symbols shown in Figure 3. Of the fifty-two leads from switch 72 to the matrix character generator 50, only the one representing the letter C is shown in the drawing as being threaded thru the matrix 50. It will be seen that the lead for the letter C is threaded in such a way as to describe the letter C within the limitations of a matrix having only thirty-five magnetic cores. The other fifty-one leads are threaded thru selected ones of the same thirty-five cores to describe the other fifty-one characters, figures and symbols. Thus, a particular core can be threaded by numerous leads to help in defining different letters or characters or figures.

The twenty-six pole double-throw switch 72 is normally in the position wherein the twenty-six input leads extending from the decoder 30 are connected to the twenty-six of the fifty-two output leads which are threaded thru the matrix 50 to describe alphabetic characters. When a signal is received over the lead labeled "Figures" from the decoder 30 to the bi-stable multivibrator 70, the multivibrator changes its conductive state and energizes the relay coil 71 in the switch 72 so that the twenty-six input leads to the switch 72 are connected to the twenty-six leads threaded thru the matrix 50 which describe the twenty-six figures and symbols. Subsequently, the coded signal corresponding with "Letters" must be received on the input lead 7 in order to reverse the conductivity state of the bi-stable multivibrator 70 before alphabetic letters again can be printed.

The five vertical leads 58′ thru 62′ threaded thru the magnetic cores are scan-out buses. The terminal 76 of a source of uni-directional potential (not shown) is connected to seven horizontal read-out buses 81′ thru 87′ threaded thru respective ones of the seven horizontal rows of magnetic cores in the matrix character generator 50. The other ends of the read-out buses are connected thru seven individual amplifiers and leads 81 thru 87 to a printing mechanism 80.

The three leads denoted "Line Feed," "Space" and "Carriage Return" from the decoder 30 of Figure 1*a* are connected to corresponding inputs of the printing mechanism 80 to control the performance of the corresponding functions therein in response to the reception at input terminal 7 of corresponding five-bit coded signals. The output of bi-stable multivibrator 65 on lead 66 is also applied over lead 77 to the input of the printing mechanism 80 to start and stop the movement of the printing mechanism along a line on the paper. The signal from the bi-stable multivibrator 65 keeps the printing mechanism running so long as signals are received which have not yet been printed.

Printing mechanism 80 may be generally similar to conventional existing electric printing machines of the type that print successive lines from left to right on a page of paper. Such machines include a line-feed mechanism for advancing the paper so that successive lines can be printed and include a carriage return mechanism to return the carriage carrying the printing mechanism at the end of a line so that the next line can be begun at the left side of the paper. The carriage is advanced along a line at a rate determined by the speed at which the message is received. In the present case, the speed at which the carriage is advanced is controlled by a signal over lead 77 from the multivibrator 65.

Figure 2:
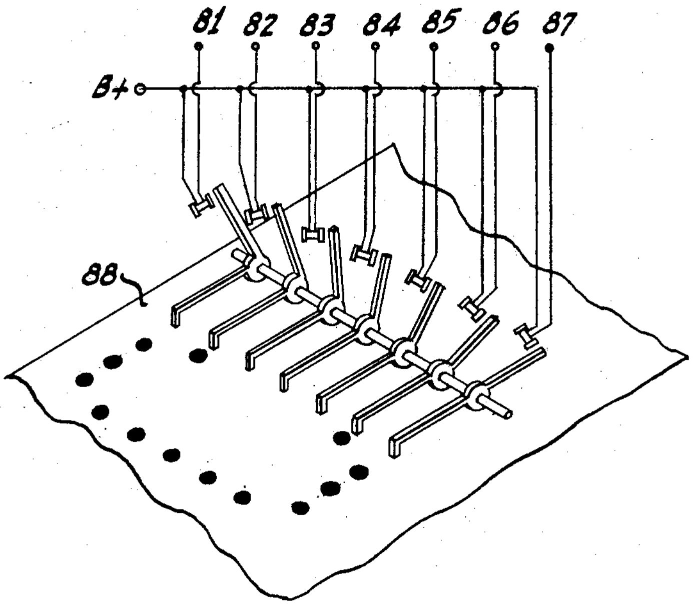
Figure 2 shows part of a printing mechanism such as may be employed in the box labeled "printer" of the system of Figures 1*a* and 1*b*.

Figure 2 shows a stylus type printing unit having seven styli each of which is controlled by one of the outputs 81 thru 87 of the corresponding horizontal read-out buses. The seven leads are connected thru seven electro-magnets to the B+ terminal of a source of unidirectional potential. The seven electro-magnets are arranged to act on corresponding ones of the seven styli to urge them into contact with the paper 88. The seven styli may be ink-carrying styli, or the paper 88 may include a plurality of sheets of paper between which carbon paper is interleaved.

The operation of that part of the circuit shown in Figures 1*b* and 2 will now be described. It is assumed that at some previous time the coded signal for "Letters" was received which placed the twenty-six pole double-throw switch 72 in that position connecting the twenty-six input leads thereto to the twenty-six output leads which are threaded thru the matrix 50 to describe the alphabetic characters. It is also assumed that the coded signal for the alphabetic character C has been supplied to the input lead 7 and has resulted in the discharge of capacitor 30' thru the decoder 30, thru the output lead of decoder 30 corresponding with the character C, thru the switch 72, thru the magnetic cores in generator 50 which describe the character C, and thru the thyratron 74 to ground. This circuit is completed when the thyratron 74 receives a positive voltage on its grid over lead 66 from the bi-stable multivibrator 65. This occurs at the end of the 5.3 millisecond pulse from the monostable multivibrator 54, the pulse being initiated by a signal from the sixth magnetic core and the ring counter 15 over leads 19 and 53. At the end of the pulse from the multivibrator 54, the blocking oscillator 55 begins oscillating. A pulse is supplied over lead 56 to the first magnetic core in the electro-magnetic commutator 57 which results in a voltage being applied from the first magnetic core over lead 64 to trigger bi-stable multivibrator 65 to the condition with the left hand tube in a conductive state. It will be understood that the resulting positive potential applied to the grid of the thyratron 74 allows the capacitor 30' (Figure 1*a*) to discharge thru the circuit thereby magnetizing the magnetic cores in the generator 50 which describe the character C in the 1 direction. All the magnetic cores were previously magnetized in the 0 direction. The alphabetic character C is thus stored in the matrix character generator 50.

After a slight delay due to the time constant of the circuit coupling the first magnetic core in the commutator 57 to the second magnetic core, a current pulse is induced in the lead 58 and the vertical scan-out bus 58' which tends to magnetize the seven magnetic cores in the first vertical column of the generator 50 in the 0 direction. This results in the generation of voltage pulses on the horizontal read-out buses 82' thru 86' which were previously magnetized in the 1 direction. These voltage pulses are amplified and applied over leads 82 thru 86 to the corresponding electro-magnets in the printing mechanism of Figure 2. The action of the electro-magnets causes the corresponding styli to be urged toward the paper to print a row of dots describing the left hand side of the alphabetic character C.

With the next cycle in the output from the blocking oscillator 55, the signal in the second magnetic core in the commutator 57 is transferred to the third magnetic core therein. This results in a voltage pulse thru the vertical scan-out bus 59' threaded thru the second vertical column of magnetic cores in character generator 50. There then results a voltage pulse on the horizontal read-out buses 81' and 87' which are amplified and applied over leads 81 and 87 to the corresponding electro-magnets in the printing mechanism of Figure 2. In the meantime, the stylus mechanism of Figure 2 has moved slightly relative to the paper 88 so that the styli print two dots to further partially define the alphabetic character C.

In a similar manner the vertical scan-out buses 60' and 61' are successively pulsed to cause the printing of additional dots defining the alphabetic character C. Finally, the vertical scan-out bus 62' is energized to cause voltage pulses on leads 82 and 86 which result in the printing of additional dots which together with the previously printed dots completely define the alphabetic character C, as shown in Figure 2. It will be understood that during the printing operation, the printing mechanism of Figure 2 is continuously moved relative to the paper 88 in response to a signal over lead 77 from the bi-stable multivibrator 65.

Coincident with the scan-out of the final vertical column of magnetic cores in matrix character generator 50, the pulse generated in the last magnetic core in commutator 57 is coupled over lead 68 to the bi-stable multivibrator 65 to change its conductive state and consequently apply a signal over lead 67 to the blocking oscillator 55 to stop the oscillations thereof. At the same time, the output of the bi-stable multivibrator 65 is applied over leads 66 and 77 to the printing mechanism 80 to stop the further advancement of that part of the printing mechanism 80 shown in Figure 2. It will be noted that the successive scan-out of the vertical buses 58' thru 62' causes all of the magnetic cores in the matrix character generator 50 to be returned to the 0 state so that they are ready for the storage of the next following character signal.

The reading-out and printing of the alphabetic character stored in the matrix character generator 50 is performed simultaneously with the receipt on input lead 7 and the decoding in decoder 30 of the next subsequent alphabetic character. This time relationship is maintained by the use of ring counter 15 and the electromagnetic commutator 57, the two being coupled together thru monostable multivibrator 54.

When the coded signal received on the input lead corresponds with one of three control functions, the signal is decoded in decoder 30 and applied directly to the printing mechanism 80 over a lead labeled "Line-Feed," "Space" or "Carriage Return." If the coded signal received on input lead 7 is a control signal for shifting between figures and letters, the signal is decoded in decoder 30 and applied over a lead labeled "Figures" or "Letters" to the bi-stable multivibrator 70 which controls the twenty-six pole double-throw switch 72.

It is apparent that according to this invention there is provided an improved system for translating coded messages to printed records which is capable of relatively high-speed operation and which is particularly simple and economical to manufacture and maintain.

What is claimed is:

1. In a system receptive on an input terminal to a coded character signal consisting of mark and space bits in time sequence, the combination of, a serial-to-simultaneous extensor having an input coupled to said input terminal and having as many outputs as there are bits in each character signal, a relay tree decoder having inputs coupled to the respective outputs of said extensor and having output leads each corresponding with a different intelligence character, an oscillator having an input coupled to said input terminal, an oscillator control multivibrator having an output coupled to said oscillator to control the starting and stopping of the oscillations thereof, a magnetic core ring counter having an input coupled to the output of said oscillator, couplings from two points in said ring counter to two inputs of said oscillator control multivibrator, a coupling from the output of said oscillator to said extensor to advance the coded character signal into said extensor, and an output from said oscillator control multivibrator coupled to said extensor to simultaneously transfer the code bits stored therein to the corresponding inputs to said decoder.

2. A system as defined in claim 1 wherein said oscillator is a blocking oscillator, and said oscillator control multivibrator is a bistable multivibrator.

3. A system as defined in claim 1, and in addition, a magnetic core matrix character generator, each of the output leads of said decoder being threaded thru the magnetic cores of said matrix to define a corresponding intelligence character, an electromagnetic commutator having a plurality of output leads each threaded thru a different group of magnetic cores in said matrix, a plurality of output buses in said matrix each threaded thru one magnetic core in each of said groups, individual printing means coupled to each of said output buses, and timing means coupled to the output of said ring counter to control the sequence of operation of said electro-magnetic commutator.

4. A system as defined in claim 3 wherein said timing means comprises an oscillator having an input coupled to the output of said ring counter and an output coupled to the input of said commutator, an oscillator control multivibrator having inputs coupled to two points in said commutator and having an output coupled to said oscillator, an electronic switch in circuit with all of the output character leads of said decoder threaded thru said matrix, and an output from said oscillator control multivibrator to said electronic switch to control the operation thereof.

5. In a telegraph printing system for printing $2n$ intelligence characters where $n$ is an integral number, the combination of, a decoder having at least $n+1$ output leads only one of which is energized at a time in response to a received signal, a switch having $n$ input leads each connected to a corresponding one of the $n$ output leads of said decoder and two groups of $n$ output leads, a magnetic core matrix character generator, means coupling each of said $2n$ output leads of said switch to cores in said matrix which define the corresponding $2n$ intelligence characters, and switch control means having an input coupled to the additional output lead of said decoder and having an output coupled to said switch to control the position thereof, said switch being positioned by said control means to connect the $n$ output leads of said decoder to one or the other of said two groups of $n$ output leads of said switch to cause said matrix to define intelligence characters in the corresponding one of said two groups selected.

6. In a telegraph printing system for printing $2n$ intelligence characters where $n$ is an integral number, the combination of, a decoder having at least $n+2$ output leads only one of which is energized at a time in response to a received signal, a switch having $n$ input leads each connected to a corresponding one of the $n$ output leads of said decoder and two groups of $n$ output leads, a magnetic core matrix character generator, means coupling each of said $2n$ output leads of said switch to cores in said matrix which define the corresponding $2n$ intelligence characters, and switch control means having inputs coupled to the two additional output leads of said decoder and having an output coupled to said switch to control the position thereof, said switch being positioned by said control means to connect the $n$ output leads of said decoder to one or the other of said groups of $n$ output leads according to which of the two additional output leads of said decoder was last energized to cause said matrix to define intelligence characters in the corresponding one of said two groups selected.

7. In a system receptive on an input terminal to a coded character signal consisting of mark and space bits in time sequence, the combination of, a serial-to-simultaneous extensor having an input coupled to said input terminal and having as many outputs as there are bits in each character signal, a decoder having inputs coupled to the respective outputs of said extensor and having output leads each corresponding with a different intelligence character, an oscillator having an input coupled to said input terminal, an oscillator control multivibrator having an output coupled to said oscillator to control the starting and stopping of the oscillations thereof, a ring counter having an input coupled to the output of said oscillator, couplings from two points in said ring counter to two inputs of said oscillator control multivibrator, a coupling from the output of said oscillator to said extensor to advance the coded character signal into said extensor, and an output from said oscillator control multivibrator coupled to said extensor to simultaneously transfer the code bits stored therein to the corresponding inputs to said decoder.

8. In a system receptive on an input terminal to a coded character signal consisting of mark and space bits in time sequence, the combination of, a serial-to-simultaneous extensor having an input coupled to said input terminal and having as many outputs as there are bits in each character signal, a decoder having inputs coupled to the respective outputs of said extensor and having output leads each corresponding with a different intelligence character, an oscillator having an input coupled to said input terminal, an oscillator control multivibrator having an output coupled to said oscillator to control the starting and stopping of the oscillations thereof, a ring counter having an input coupled to the output of said oscillator, couplings from two points in said ring counter to two inputs of said oscillator control multivibrator, a coupling from the output of said oscillator to said extensor to advance the coded character signal into said extensor, means for coupling an output from said oscillator control multivibrator to said extensor to simultaneously transfer the code bits stored therein to the corresponding inputs to said decoder, a magnetic core matrix character generator, each of said output leads of said decoder being threaded through the magnetic cores of said matrix to define a corresponding intelligence character, a commutator having a plurality of output leads each threaded through a different group of magnetic cores in said matrix, a plurality of output busses in said matrix each threaded through one magnetic core in each of said groups, individual printing means coupled to each of said output busses, and timing means coupled to the output of said ring counter to control the sequence of operation of said commutator.

9. A system as defined in claim 8 and wherein said timing means comprises an oscillator having an input coupled to the output of said ring counter and an output coupled to the input of said commutator, an oscillator control multivibrator having inputs coupled to two points in said commutator and having an output coupled to said oscillator, an electronic switch in circuit with all of the output character leads of said decoder threaded thru said matrix, and an output from said oscillator control multivibrator to said electronic switch to control the operation thereof.

10. A system as defined in claim 9 and wherein said electronic switch is a thyratron tube.

References Cited in the file of this patent

UNITED STATES PATENTS

| | | |
|---|---|---|
| Re. 23,713 | Hunt | Sept. 22, 1953 |
| 2,248,820 | Haselton | July 8, 1941 |
| 2,640,164 | Giel et al. | May 26, 1953 |
| 2,658,943 | Durkee | Nov. 10, 1953 |
| 2,697,178 | Isborn | Dec. 14, 1954 |
| 2,700,696 | Barker | Jan. 25, 1955 |
| 2,712,037 | Phelps et al. | June 28, 1955 |
| 2,724,739 | Harris | Nov. 22, 1955 |

OTHER REFERENCES

"Static Magnetic Memory" by Marshall Kincaid et al., found in "Electronics," January 1951, pages 108–111.

"Static Magnetic Memory—Its Applications to Computers and Controlling Systems" by An Wang, found in the "Proceedings of Association of Computing Machinery," May 2 and 3, 1952, pp. 207–212.

"High Speed Magnetic-Core Output Printer" by Bernard M. Gordon and Renato N. Nicola, found in "Proceedings of the Association for Computing Machinery," September 1952.